United States Patent
Eckel et al.

(10) Patent No.: US 6,444,735 B1
(45) Date of Patent: *Sep. 3, 2002

(54) FLAME-RESISTANT POLYCARBONATE ABS MOLDING MATERIALS

(75) Inventors: Thomas Eckel, Dormagen; Dieter Wittmann, Leverkusen; Bernd Keller, Geldern; Heinrich Alberts, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/485,100

(22) PCT Filed: Jul. 29, 1998

(86) PCT No.: PCT/EP98/04731

§ 371 (c)(1), (2), (4) Date: Feb. 4, 2000

(87) PCT Pub. No.: WO99/07791

PCT Pub. Date: Feb. 18, 1999

(30) Foreign Application Priority Data

Aug. 11, 1997 (DE) .......................................... 197 34 666

(51) Int. Cl.⁷ ................................................. C08K 3/00
(52) U.S. Cl. ........................... 524/127; 525/67; 525/462
(58) Field of Search ..................... 525/67, 462; 524/127

(56) References Cited

U.S. PATENT DOCUMENTS

| | | | | |
|---|---|---|---|---|
| 3,166,606 A | * | 1/1965 | Reinking | |
| 4,186,154 A | * | 1/1980 | Binsack et al. | ............. 525/461 |
| 4,983,658 A | * | 1/1991 | Kress et al. | .................. 525/67 |
| 5,204,394 A | * | 4/1993 | Gosens et al. | .............. 524/127 |
| 5,750,602 A | * | 5/1998 | Kohler et al. | ............... 524/127 |

FOREIGN PATENT DOCUMENTS

EP   0 771 851   5/1997

OTHER PUBLICATIONS

RD 355 030 English Abstract, Nov. 10, 1993.*

* cited by examiner

Primary Examiner—Margaret Medley
(74) Attorney, Agent, or Firm—Joseph C. Gil; Aron Preis; James R. Franks

(57) ABSTRACT

A flame resistant thermoplastic molding composition is disclosed. The composition contains a mixture of two aromatic polycarbonates having differing solution viscosities, a vinyl(co)polymer made from at least two ethylenically unsaturated monomers, a graft polymer obtainable by graft polymerization of at least two monomers selected from chloroprene, 1,3-butadiene, isoprene, styrene, acrylonitrile, ethylene, propylene, vinyl acetate and (meth)acrylates with 1 to 18 carbon atoms in the alcohol component, a phosphorous compound, a fluorinated polyolefin and an inorganic compound with an average particle size no greater than 200 nm. The inventive composition is additionally characterized in its improved stress cracking resistance.

15 Claims, No Drawings

FLAME-RESISTANT POLYCARBONATE ABS MOLDING MATERIALS

CROSS REFERENCE TO RELATED PATENT APPLICATIONS

The present patent application claims the right of priority under 35 U.S.C. 119 and 35 U.S.C. 365 of International Application No. PCT/EP98/04731, filed Jul. 29, 1998, which was published in German as International Patent Application No. WO 99/07791 on Feb. 18, 1999, which is entitled to the right of priority of German Patent Application No. 197 34 666.9, filed Aug. 11, 1997.

The present invention relates to polycarbonate/ABS moulding compositions which have been rendered flame-resistant with phosphorus compounds, which have an outstanding set of mechanical properties, in particular an outstanding resistance to stress cracking, and are flame-resistant.

EP-A 0 174 493 describes flame-resistant, halogen-containing polymer mixtures consisting of aromatic polycarbonate, styrene-containing graft copolymer, monophosphates and a specific polytetrafluoroethylene formulation. Although these mixtures have adequate fire resistance and mechanical properties, the surface quality of moulded items may be impaired when using high processing temperatures. The moulded items also exhibit some deficiencies in stress crack resistance.

EP-A 0 363 608 describes polymer mixtures consisting of aromatic polycarbonate, styrene-containing copolymer or graft copolymer and oligomeric phosphates as flame-resistant additives. The stress crack resistance of these mixtures is often not sufficient to enable the production of thin-walled housing parts.

EP-A 771 851 describes moulding compositions which contain aromatic polycarbonate, graft copolymer based on a diene rubber, an SAN copolymer, a phosphate and tetrafluoroethylene polymers, wherein the polycarbonate has a variety of molecular weights. However, no very finely divided inorganic compounds are described as a constituent of the moulding compositions.

The object of the present invention was to provide flame-resistant polycarbonate/ABS moulding compositions which have outstanding stress crack resistance as well as very good processing properties and which are particularly suitable for producing thin-walled housing parts.

Surprisingly it was found that polycarbonate/ABS moulding compositions which have a greatly improved stress crack resistance are produced by using specific mixtures of polycarbonates, each with clearly differentiated solution viscosities, combined with very finely divided inorganic compounds.

Therefore the invention provides flame-resistant, thermoplastic moulding compositions containing A 5 to 95, preferably 10 to 90, in particular 20 to 80 parts by weight of a mixture of two aromatic polycarbonates A.1 and A.2 with different solution viscosities, wherein
1. the relative solution viscosity of A.1 is 1.18 to 1.24,
2. the relative solution viscosity of A.2 is 1.24 to 1.34 and
3. the difference between the relative solution viscosities of A.1 and A.2 is equal to or greater than 0.06, wherein one or more further polycarbonates may be added to the mixture of A.1 and A.2, B 0 to 50, preferably 1 to 30, in particular 2 to 25 parts by weight of a (co)polymer consisting of 1 or at least 2 ethylenically unsaturated monomers.

C 0.5 to 60, preferably 1 to 40, in particular 2 to 30 parts by weight of graft polymers, obtainable by graft polymerisation of at least two monomers selected from the group consisting of chloroprene, butadiene, isoprene, styrene, acrylonitrile, ethylene, propylene, vinyl acetate and (meth)acrylates with 1 to 18 carbon atoms in the alcohol component, D 0.5 to 20 parts by weight, preferably 1 to 18 parts by weight, in particular 2 to 15 parts by weight of a phosphorus compound of the formula (1)

$$R^1-(O)_n-\overset{O}{\underset{\underset{R^2}{(O)_n}}{P}}-\left[O-X-O-\overset{O}{\underset{\underset{R^3}{(O)_n}}{P}}\right]_N-(O)_n-R^4 \quad (I)$$

in which
$R^1$, $R^{2'}$ $R^3$ and $R^4$, independently of each other, represent an optionally halogenated $C_1$–$C_8$ alkyl group, or a $C_5$–$C_6$ cycloalkyl, $C_6$–$C_{20}$ aryl, or $C_7$–$C_{12}$ aralkyl group, each optionally substituted by halogen and/or $C_1$–$C_4$ alkyl groups
n each, independently, represents 0 or 1
N is 0 to 30 and
X represents a mono- or polynuclear aromatic group with 6 to 30 carbon atoms, E 0.05 to 5 parts by weight, preferably 0.1 to 1 part by weight, in particular 0.1 to 0.5 parts by weight of a fluorinated polyolefin, F 0.01 to 50 parts by weight, preferably 0.1 to 10 parts by weight per 100 parts by weight of A to E of very finely divided inorganic compound with an average particle diameter of less than or equal to 200 nm, preferably less than or equal to 150 nm, in particular less than or equal to 100 nm.

The sum of all the parts by weight of A+B+C+D+E+F is 100.

Moulding compositions according to the invention, due to their exceptional flame resistance, stress crack resistance and very good processing properties are particularly suitable for preparing thin-walled moulded articles (housing parts for data processing units), where high processing temperatures and pressures lead to considerable strain on the material used.

Component A

Thermoplastic, aromatic polycarbonates which are suitable for use as component A according to the invention are those based on diphenols of the formula (II)

$$HO-\underset{(B)_x}{\text{⟨⟩}}-[A]-\underset{(B)_x}{\text{⟨⟩}}-OH \quad (II)$$

in which
A represents a single bond or a $C_1$–$C_5$ alkylene, $C_2$–$C_5$ alkylidene, $C_5$–$C_6$ cycloalkylidene, —S—, —SO$_2$—, —O—, —CO— or $C_6$–$C_{12}$ arylene group,
B represents chlorine or bromine,
X is 0, 1 or 2 and
P is 1 or 0 or alkyl substituted dihydroxyphenylcycloalkanes of the formula (III)

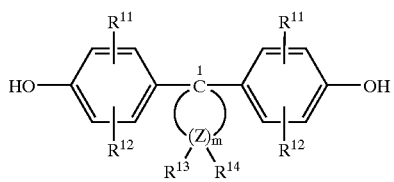

in which
R¹¹ and R¹², independently of each other, each represent hydrogen, a halogen, preferably chlorine or bromine, or a $C_1$–$C_8$ alkyl, preferably $C_1$–$C_4$ alky, $C_5$–$C_6$ cycloalkyl, $C_6$–$C_{10}$ aryl, preferably phenyl, or $C_7$–$C_{12}$ aralkyl, preferably a phenyl-$C_1$–$C_4$ alkyl, in particular benzyl, group
m is an integer, from 4 to 7, preferably 4 or 5,
R¹³ and R¹⁴ can be individually chosen for each Z, and, independently of each other, represent hydrogen or a $C_1$–$C_6$ alkyl group, preferably hydrogen, methyl or ethyl,
and
z represents carbon, with the proviso that, on at least one atom Z, R¹³ and R¹⁴ simultaneously represent an alkyl group.

Suitable diphenols of the formula (II) are e.g. hydroquinone, resorcinol, 4,4'dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane.

Preferred diphenols of the formula (II) are 2,2-bis4-hydroxyphenyl)propane, 2,2-bis-(3,5-dichloro-4-hydroxyphenyl)-propane and 1,1-bis-(4hydroxyphenyl)-cyclohexane.

Preferred diphenols of the formula (III) are dihydroxy-diphenylcycloalkanes with 5 or 6 ring carbon atoms in the cycloaliphatic grouping (m=4 or 5 in formula (III)) such as for example diphenols with the formulae

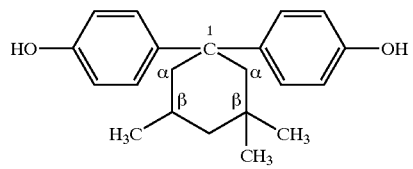

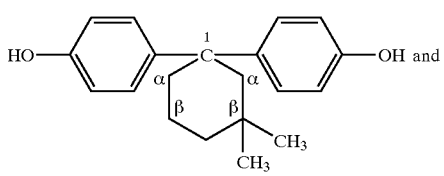

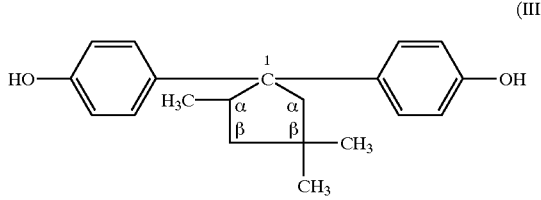

wherein 1,1-bis-(4-hydroxyphenyl)-3,3,5-trimethylcyclohexane (formula (IIIa)) is particularly preferred.

Polycarbonates which are suitable for use as component A according to the invention may be branched in a known way, that is preferably by the incorporation of 0.05 to 2.0 mol %, with respect to the sum of diphenols used, of tri-functional or more than tri-functional compounds, e.g. those with three or more than three phenolic groups, such as for example
phloroglucine
4,6-dimethyl-2,4,6-tri-(4-hydroxyphenyl)-hept-2-ene
4,6-dimethyl-2,4,6-tri-(4-hydroxyphenyl)-heptane
1,3,4-tri-(4-hydroxyphenyl)-benzene
1,1,1-tri-(4-hydroxyphenyl)-ethane
tri-(4-hydroxyphenyl)-phenylmethane
2,2-bis-(4,4-bis-(4-hydroxyphenyl)-cyclohexyl)-propane
2,4-bis-(4,4-bis-(4-hydroxyphenyl)-isopropyl)-phenol
2,6-bis-(2-hydroxy-5'-methylbenzyl)-4-methyl-phenol
2-(4-hydroxyphenyl)-2-(2,4-dihydroxyphenyl)-propane
hexa-(4-(4-hydroxyphenylisopropyl)-phenyl) orthoterephthalate
tetra-(4-hydroxyphenyl)-methane
tetra-(4-(4-hydroxyphenylisopropyl)phenoxy)-methane and
1,4-bis-((4'-,4'-dihydroxytriphenyl)-methyl)-benzene A few other trifunctional compounds are 2,4-dihydroxybenzoic acid, trimesic acid, cyanuric chloride and 3,3-bis-(3 methyl-4-hydroxyphenyl)-2-oxo-2,3-dihydroindole.

Preferred polycarbonates, in addition to bisphenol-A homopolycarbonate, are copolycarbonates of bisphenol-A with up to 15 mol %, with respect to the molar sum of diphenols, of 2,2-bis-(3,5-dibromo-4-hydroxyphenyl)-propane.

Some of the aromatic polycarbonates in component A may be exchanged for aromatic polyestercarbonates.

Aromatic polycarbonates in component A may also contain polysiloxane blocks. The preparation of these is described, for example, in DE-OS 33 34 872 and U.S. Pat. No. 3,821,325.

Aromatic polycarbonates and/or aromatic polyestercarbonates in accordance with component A are known from the literature or can be prepared by processes known from the literature (to prepare aromatic polycarbonates, see for example, Schnell "Chemistry and Physics of Polycarbonates" Interscience Publishers 1964 and DE-AS 1 495 626, DE-OS 2 232 877, DE-OS 2 703 376, DE-OS 2 714 544, DE-OS 3 000 610, DE-OS 3 832 396; to prepare aromatic polyestercarbonates, see e.g. DE-OS 3 077 934).

Aromatic polycarbonates and/or polyestercarbonates are prepared, for example, by reacting diphenols with carbonic acid halides, preferably phosgene, and/or with aromatic dicarboxylic acid dihalides, preferably benzene dicarboxylic acid halides, by the phase interface process, optionally using chain terminators and optionally using trifunctional or more than trifunctional branching agents.

Polycarbonates A.1 and A.2 preferably have the same structures, i.e. they are built up from the same monomers.

Particularly preferably, both polycarbonates A.1 and A.2 and also the optionally further added polycarbonate A are built up from the same monomers, i.e. they have the same chemical structure.

A further polycarbonate is preferably added up to an amount of 30 wt. % (with respect to the amount of A.1 and A.2).

With respect to the mixture of polycarbonates A.1 and A.2, the proportion by weight of A.1 is 5 to 95, preferably 10 to 75 wt %, in particular 10 to 35 wt. %, and the proportion by weight of A.2 is 95 to 5, preferably 90 to 25 wt %, in particular 90 to 65 wt. %.

The mixture of polycarbonates A.1 and A.2 is characterised in that the relative solution viscosity of A.1 is, 1.18 to 1.24, that the relative solution viscosity of A.2 is 1.24 to 1.34 and that the difference between the relative solution viscosities of A.1 and A.2 is greater than or equal to 0.06, in particular greater than or equal to 0.09, i.e. the relative solution viscosity of (A.2) minus the relative solution viscosity of (A.1) is $\geq 0.06$, in particular $\geq 0.09$. The relative solution viscosity is measured in $CH_2Cl_2$ as solvent at 25° C., at a concentration of 0.5 g/1 00 ml.

One or both polycarbonate constituents A.1 or A.2 in the mixture may be a recycled polycarbonate. Recycled polycarbonates are understood to be those products which have already passed through one processing and life cycle and from which adhering impurities have been sufficiently well removed, by means of a special working-up process, for them to be suitable for further use.

Component B

Thermoplastic polymer B comprises (co)polymers of one or at least two ethylenically unsaturated monomers (vinyl monomers) such as for example styrene, α-methylstyrene, ring-substituted styrenes (e.g. halogen and/or alkyl ring-substituted), acrylonitrile, methacrylonitrile, methyl methacrylate, maleic anhydride, N-subsfituted maleic imide and (meth)acrylates with 1 to 18 carbon atoms in the alcohol component.

(Co)polymers in accordance with component B are resinous, thermoplastic and rubber-free. The moulding compositions may also contain different (co)polymers B.

Preferred vinyl (co)polymers B are those consisting of at least one monomer from the set consisting of styrene, a-methylstyrene, ring-substituted styrene and/or methyl methacrylate (B.1) with at least one monomer from the set consisting of acrylonitrile, methacrylonitrile, methyl methacrylate, maleic anhydride and/or N-aryl substituted maleic imide (B.2).

The concentration of monomers B.1 in the (co)polymer is preferably 50 to 99, in particular 60 to 95 wt. %, that of monomers B.2 is preferably 1 to 50, in particular 5 to 40 wt. %.

Particularly preferred (co)polymers B are those consisting of styrene with acrylonitrile and optionally methyl methacrylate, of α-methylstyrene with acrylonitrile and optionally with methyl methacrylate, or of styrene and α-methylstyrene with acrylonitrile and optionally methyl methacrylate.

(Co)polymers in accordance with component B are known and can be prepared by radical polymerisation, in particular by emulsion, suspension, solution or bulk polymerisation. (Co)polymers in accordance with component B preferably have molecular weights $\overline{M}_w$ (weight average, determined by light scattering or sedimentation) between 15,000 and 200,000.

Particularly preferred (co)polymers B according to the invention are also random copolymers built up from styrene and maleic anhydride which are preferably prepared by continuous bulk or solution polymerisation with incomplete conversion of the corresponding monomers.

The proportions of the two components in suitable random copolymers according to the invention and built up from styrene and maleic anhydride may vary within wide limits. The preferred concentration of maleic anhydride is 5 to 25 wt. %. Instead of styrene, the polymers may also contain ring-substituted styrenes such as p-methylstyrene, 2,4-dimethylstyrene and other substituted styrenes such as α-methylstyrene.

The molecular weight (number average $\overline{M}_n$) of random copolymers according to the invention built up from styrene and maleic anhydride in accordance with component B may vary over a wide range. The range is preferably from 60,000 to 200,000. The intrinsic viscosity of these products is preferably 0.3 to 0.9 (measured in dimethylformamide at 25° C.; see Hoffman, Krömer, Kuhn, Polymeranalytik I, Stuttgart 1977, pages 316 et seq).

Component C

Component C in accordance with the invention is a graft polymer. These include graft copolymers with rubber-elastic properties which are substantially obtainable from at least two of the following monomers: chloroprene, 1,3-butadiene, isoprene, styrene, acrylonitrile, ethylene, propylene, vinyl acetate and (meth)acrylates with 1 to 18 carbon atoms in the alcohol component; that is polymers such as are described e.g. in "Methoden der Organischen Chemie" (Houben-Weyl), Volume 14/1, Georg Thieme-Verlag, Stuttgart 1961, pages 393–406 and in C.B.Bucknall "Toughened Plastics", Appl. Science Publishers, London 1977. Preferred polymers C are partially cross-linked and have gel contents of more than 20 wt. %, preferably more than 40 wt. %, in particular more than 60 wt. %.

Preferred graft polymers C comprise:

C.1 5 to 95, preferably 30 to 80, parts by weight of a mixture of

C.1.1 50 to 99 parts by weight of styrene, α-methylstyrene, halogen or methyl ring-substituted styrenes, methyl methacrylate or mixtures of these compounds and C.1.2 1 to 50 parts by weight of acrylonitrile, methacrylonitrile, methyl methacrylate, maleic anhydride, $C_1$–$C_4$ alkyl- or phenyl-N-substituted maleic imides or mixtures of these compounds on C.2 5 to 95, preferably 20 to 70, parts by weight, of a polymer based on diene and/or an alkyl acrylate with a glass transition temperature below –10° C.

Preferred graft polymers C are e.g. substrates C.2 such as polybutadienes, butadiene/styrene copolymers and acrylate rubbers grafted with styrene and/or acrylonitrile and/or alkyl (meth)acrylates, i.e. copolymers of the type described in DE-OS 1 694 173 (=U.S. Pat No. 3,564,077); or polybutadienes, butadiene/styrene or butadiene/acrylonitrile copolymers, polyisobutenes or polyisoprenes grafted with alkyl acrylates or alkyl methacrylates, vinyl acetate, acrylonitrile, styrene and/or alkylstyrenes, such as are described e.g. in DE-OS 2 348 377 (=U.S. Pat. No. 3,919, 353).

Particularly preferred polymers C are e.g. ABS polymers such as are described e.g. in DE-OS 2 035 390 (=U.S. Pat. No. 3,644,574) or in DE-OS 2 248 242 (=GB-PS 1 409 275).

Particularly preferred graft polymers C are obtainable by a grafting reaction of α 10 to 70, preferably 15 to 50, in particular 20 to 40 wt. %, with respect to graft polymer C, of at least one (meth)acrylate or 10 to 70, preferably 15 to 50, in particular 20 to 40 wt. %, of a mixture of 10 to 50, preferably 20 to 35 wt. %, with respect to the mixture, of acrylonitrile or (meth)acrylate and 50 to 90, preferably 65 t6 80 wt. %, with respect to the mixture, of styrene, as applied graft C.1, on β 30 to 90, preferably 50 to 85, in particular 60 to 80 wt. %, with respect to graft polymer C, of a butadiene polymer with at least 50 wt. %, with respect to β, of butadiene groups, as graft substrate C.2, wherein the gel fraction in the graft substrate 0 is preferably at least 70 wt. % (measured in toluene), the degree of grafting G is 0.15 to 0.55 and the average particle diameter $d_{50}$ of the graft polymer C.2 is 0.05 to 2 μm, preferably 0.1 to 0.6 μm.

(Meth)acrylates a are esters of acrylic acid or methacrylic acid with monohydric alcohols with 1 to 18 carbon atoms. Methyl-, ethyl- and propyl methacrylate, n-butyl acrylate, t-butyl acrylate and t-butyl methacrylate are particularly preferred.

Graft substrate β may contain, in addition to butadiene groups, up to 50 wt. %, with respect to β, of groups from other ethylenically unsaturated monomers such as styrene, acrylonitrile, esters of acrylic or methacrylic acid with 1 to 4 carbon atoms in the alcohol components (such as methyl acrylate, ethyl acrylate, methyl methacrylate, ethyl methacrylate), vinyl esters and/or vinyl ethers. The preferred graft substrate β consists of pure polybutadiene.

The degree of grafting G is the ratio by weight. of grafted monomers to graft substrate and is dimensionless.

The average particle size $d_{50}$ is the diameter above and below which 50% of the particle diameters are located. It may be determined by means of ultracentrifuge measurements (W. Scholtan, H. Lange, Kolloid, Z. und Z. Polymere 250 (1972) 782–796).

Particularly preferred polymers C are also e.g. graft polymers of

τ20 to 90 wt. %, with respect to component C, of acrylate rubber with a glass transition temperature below −20° C. as graft substrate C.2 and δ6 10 to 80 wt. %, with respect to component C, of at least one polymerisable ethykenically unsaturated monomer as graft monomer C. 1.

Acrylate rubbers T in polymers C are preferably polymers of alkyl acrylates, optionally with up to 40 wt. % with respect to τ, of other polymerisable ethylenically unsaturated monomers. Preferred polymerisable acrylates include $C_1$–$C_8$ alkyl esters, for example methyl, ethyl, butyl, n-octyl and 2-ethylhexyl esters; halogenated alkyl esters, preferably halogenated $C_1$–$C_8$ alkyl esters such as chloroethyl acrylate, and mixtures of these monomers.

In order to cross-link the product, monomers with more than one polymerisable double bond may be copolymerised. Preferred examples of cross-linking monomers are esters of unsaturated monocarboxylic acids with 3 to 8 carbon atoms and unsaturated monohydric alcohols with 3 to 12 carbon atoms or saturated polyols with 2 to 4 OH groups and 2 to 20 carbon atoms such as, for example, ethyleneglycol dimethacrylate, allyl methacrylate; polyunsaturated heterocyclic compounds such as, for example, trivinyl and triallyl cyanurate; polyfunctional vinyl compounds such as divinyl- and trivinylbenzene; but also triallyl phosphate and diallyl phthalate.

Preferred cross-linking monomers are allyl methacrylate, ethyleneglycol dimethylacrylate, diallyl phthalate and heterocyclic compounds which contain at least 3 ethylenically unsaturated groups.

Particularly preferred cross-linking monomers are the cyclic monomers triallyl cyanurate, triallyl isocyanurate, trivinyl cyanurate, triacryloyl hexahydro-s-triazine, triallylbenzenes.

The amount of cross linking monomers is preferably 0.02 to 5, in particular 0.05 to 2 wt. %, with respect to graft substrate τ.

In the case of cyclic cross-linking monomers with at least 3 ethylenically unsaturated groups, it as advantageous to restrict the amount to less than 1 wt. % of the graft substrate τ.

Preferred "other" polymerisable ethylenically unsaturated monomers, apart from acrylates, which may optionally be used to prepare graft substrates τ are e.g. acrylonitrile, styrene, α-methylstyrene, acrylamide, vinyl $C_1$–$C_6$ alkyl ethers, methyl methacrylate, butadiene. Preferred acrylate rubbers for use as graft substrates r are emulsion polymers which have a gel content of at least 60 wt. %.

Further suitable graft substrates in accordance with C.2 are silicone rubbers with graft-active sites such as are described in DE-OS 3 704 657, DE-OS 3 704 655, DE-OS 3 631 540 and DE-OS 3 631 539.

The gel content of graft substrate C.2 is determined at 25° C. in dimethylformamide (M. Hoffman, H. Krömer, R. Kuhn, Polymeranalytik I and II, Georg Thieme-Verlag, Stuttgart 1977).

The graft polymer C may be prepared by known processes such as bulk, suspension, emulsion or bulk-suspension processes.

Since, as is known, the grafting monomers cannot be grafted onto the grafting substrate completely and absolutely during the grafting reaction, graft polymers C according to the invention are also understood to be those products which are obtained by the polymerisation of graft monomers in the presence of the graft substrate.

Component D

Moulding compositions according to the invention contain, as flame-resistant agents, at least one organic phosphorus compound or a mixture of organic phosphorus compounds of the formula (1).

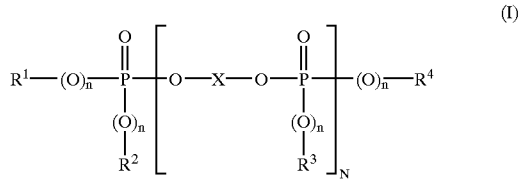

In the formula, $R^1$, $R^2$, $R^3$ and $R^4$ are defined in the same way as given above. $R^1$, $R^2$, $R^3$ and $R^4$ preferably represent a $C_1$–$C_4$ alkyl group or a phenyl, naphthyl or phenyl-$C_1$–$C_4$ alkyl group. The aromatic groups $R^1$, $R^2$, $R^3$ and $R^4$ for their part may be substituted by halogen and/or alkyl groups (preferably $C_1$–$C_4$ alkyl groups). Particularly preferred aryl groups are cresyl, phenyl, xylenyl, propylphenyl or butylphenyl and the corresponding brominated and chlorinated derivatives thereof.

X in formula (I) represents a mono- or polynuclear aromatic group with 6 to 30 carbon atoms. This is preferably derived from diphenyls in accordance with formula (II) such as e.g. bisphenol-A, resorcinol or hydroquinone or their chlorinated or brominated derivatives.

N in formula (I) may, each independently, be 0 or 1; n is preferably 1.

N may have any value from 0 to 30.

In the case of mixtures of phosphorus compounds, N may have an average value of 0 to 30, preferably an average value of 0.3 to 20, in particular 0.5 to 10, especially 0.5 to 6. Monophosphorus compounds and/or oligomeric phosphorus compounds may be contained in this mixture. In the event that N=0, formula (1) describes monophosphorus compounds.

Phosphorus compounds of the formula (I) are preferably tributylphosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen substituted aryl phosphates, dimethyl methylphosphonate, diphenyl methylphosphonate, diethyl phenylphosphonate, triphenylphosphine oxide and/or m-phenylene-bis(diphenyl) phosphate.

Mixtures of phosphorus compounds of the formula (I) with N values from 0.5 to 10, in particular 0.5 to 6, are preferred.

Monomeric and oligomeric phosphorus compounds of the formula (1) are preferably chosen in the mixture, so that a synergistic effect is produced. The mixture generally consists of 10 to 90 wt. % of dimers and/or oligomers and 90 to 10 wt. % of monophosphorus compounds, preferably monophosphate compounds of the formula (I). The monophosphorus compounds are preferably mixed within the range from 12 to 50, preferably 14 to 40, in particular 15 to 40 wt. %, with the complementary amount of oligomeric phosphorus compounds.

Phosphorus compounds in accordance with component D are known (see e.g. EP-A 363 608, EP-A 640 655) or can be prepared by known methods in an analogous manner (e.g. Ulhmanns Encyklopadie der technischen Chemie, Vol. 18, page 301 et seq 1979; Houben-Weyl, Methoden der organischen Chemie, Vol. 12/1, p. 43; Beilstein Vol. 6, p. 177).

Component E

Fluorinated polyolefins E are high molecular weight compounds and have glass transition temperatures above -30° C., generally above 100° C., fluorine contents of preferably 65 to 76, in particular 70 to 76 wt. %, average particle diameters $d_{50}$ of 0.05 to 1000, preferably to 0.08 to 20 μm. In general, the fluorinate polyolefins E have a density of 1.2 to 2.3 g/cm$^3$.

Preferred fluorinated polyolefins E are polytetrafluoroethylene, polyvinylidene fluoride, tetrafluoroethylene/hexafluoropropylene copolymers and ethylene/tetrafluoroethylene copolymers.

Fluorinated polyolefins are known (see "Vinyl and Related Polymers" by Schildknecht, John Wiley & Sons, Inc., New York, 1962, pp 484–494; "Fluoropolymers" by Wall, Wiley-Interscience, John Wiley & Sons Inc., New York, Vol. 13, 1970, pp 623–654; "Modem Plastics Encyclopedia" 1970 to 1971, Vol. 47, No. 10A, October 1970, McGraw-Hill, Inc., New York, pp 134 and 774; "Modern Plastics Encyclopedia" 1975 to 1976, October 1975, Vol. 52, No. 10A, McGraw-Hill, Inc., New York, pp 27,28 and 472 and U.S. Pat. No. 3 671 487, 3 723 373 and 3 838 092).

They can be prepared by known processes, for example by polymerisation of tetrafluoroethylene in aqueous medium with a free radical-forming catalyst, for example sodium, potassium or ammonium peroxydisulfate at pressures of 7 to 71 kg/cm$^2$ and at temperatures of 0 to 200° C., preferably at temperatures of 20 to 100° C. (See e.g. U.S. Pat. No. 2 393 967 for more details). Depending on the form actually used, the density of these materials may be between 1.2 and 2.3 g/cm, and the average particle size between 0.05 and 1000 μm.

Preferred fluorinated polyolefins E according to the invention are tetrafluoroethylene polymers and have average particle diameters of 0.05 to 20 μm, preferably 0.08 to 10 μm, and a density of 1.2 to 1.9 g/cm$^3$ and are preferably used in the form of a coagulated mixture of emulsions of tetrafluoroethylene polymers E with emulsions of graft polymers C.

Suitable tetrafluoroethylene polymer emulsions are commercially available products and are sold for example by Du Pont as Teflon® 30N.

Suitable fluorinated polyolefins E which can be used in a powder form are tetrafluoroethylene polymers with average particle diameters of 100 to 1000 μm and densities of 2.0 g/cm$^3$ to 2.3 g/cm$^3$.

To prepare a coagulated mixture of C and E, an aqueous emulsion (latex) of a graft polymer C with an average latex particle diameter of 0.05 to 2 μm, in particular 0.1 to 0.6 μm, is first mixed with a finely divided emulsion of a tetrafluoroethylene polymer E in water with average particle diameters of 0.05 to 20 μm, in particular 0.08 to 10 μm. Suitable tetrafluoroethylene polymer emulsions generally have solids contents of 30 to 70 wt. %, in particular 50 to 60 wt. %.

The aqueous emulsion of graft polymer C has a solids content of 25 to 60 wt. %, preferably 30 to 45 wt. %, in particular 30 to 35 wt. %.

The data given on amounts in the description of component C does not include the proportion of graft polymer in the coagulated mixture of graft polymer and fluorinated polyolefins.

In the emulsion mixture, the ratio by weight of graft polymer C to tetrafluoroethylene polymer E is 95:5 to 60:40. The emulsion mixture is coagulated in a known manner, for example by spray drying, freeze drying or coagulating by adding inorganic or organic salts, acids, bases or organic water-miscible solvents such as alcohols or ketones, preferably at temperatures of 20 to 150° C. in particular 50 to 100° C. If required drying may be performed at 50 to 200° C., preferably 70 to 100° C.

Component F

Very finely divided inorganic compounds in accordance with component F consist of compounds of one or more metals from groups IA to SA and IB to 8 in Mendelejew's periodic system of elements, preferably groups 2A to 5A and 4B to 8, in particular 3A to 5A and 4B to 8, with at least one element selected from the group consisting of oxygen, sulfur, boron, phosphorus, carbon, nitrogen, hydrogen or silicon.

Preferred compounds are for example oxides, hydroxides, hydrated oxides, sulfates, sulfites, sulfides, carbonates, carbides, nitrates, nitrites, nitrides, borates, silicates, phosphates, hydrides, phosphites or phosphonates.

Preferred very finely divided inorganic compounds are for example TiN, $TiO_2$, $SnO_2$, WC, ZnO, $Al_2O_3$, AlO(OH), $ZrO_2$, $Sb_2O_3$, $SiO_2$, iron oxides, $Na_2SO_4$, $BaSO_4$, vanadium oxides, zinc borate, silicates such as aluminum silicates, magnesium silicates, and one-, two- or three-dimensional silicates. Mixtures and doped compounds may also be used. Furthermore these nano-scale particles may be surface-modified with organic molecules in order to produce better compatibility with the matrix. Hydrophobic or hydrophilic organic surfaces can be produced in this way.

The average particle diameters are less than or equal to 200 nm, preferably less than or equal to 150 nm, in particular from 1 to 100 nm.

The particle size and particle diameter refer to the average particle diameter $d_{50}$, determined by ultracentrifuge measurements in accordance with W. Scholtan et al Kolloid-Z und Z. Polymere 250 (1972), pp 782–796.

The inorganic compounds may be used as powders, pastes, sols, dispersions or suspensions. Powders can be obtained by precipitation from dispersions, sols or suspensions.

The powders can be incorporated into the thermoplastic plastics using conventional processes, for example by direct compounding or extruding of the constituents in the moulding composition and the very finely divided organic powders. A preferred process is the production of a master batch, e.g. the coprecipitation of dispersions of components B or C with dispersions, suspensions, pastes or sols of the very finely divided inorganic materials in flame-resistant additives, other additives, monomers, solvents or in thermoplastics A.

Moulding compositions according to the invention may contain at least one of the conventional additives such as lubricants and mould release agents, nucleating agents, anti-static agents, stabilisers and dyes and pigments.

Moulding compositions according to the invention may also contain flame-resistant compounds which are different from those of the formula (I) in an amount of up to 20 parts by weight. Synergistic flame-resistant agents are preferred. The following are mentioned by way of example as further flame-resistant agents; organic halogenated compounds such as decabromobisphenylether, tetrabromobisphenol, inorganic halogen compounds such as ammonium bromide, nitrogen compounds such as melamine, melamine-formaldehyde resins or siloxane compounds. Moulding compositions according to the invention may optionally contain inorganic substances which differ from the inorganic compounds F, such as for example inorganic hydroxide compounds such as magnesium and aluminium hydroxide, inorganic compounds such as aluminium oxide, antimony oxides, barium metaborate, hydroxyantimonate, zirconium oxide, zirconium hydroxide, molybdenum oxide, ammonium molybdate, zinc borate, ammonium borate and tin oxide.

Moulding compositions according to the invention containing components A to F and optionally further known additives such as stabilisers, dyes, pigments, lubricants and mould release agents, nucleating agents and anti-static agents, are prepared by mixing the particular constituents in a known manner and melt-compounding and melt-extruding at temperatures of 200 to 300° C. in conventional equipment such as internal compounders, extruders and twin-shaft screws, wherein component E is preferably used in the form of the coagulated mixture mentioned above.

Mixing the individual constituents may take place in a known manner, either in sequence or simultaneously, in fact either at about 20° C. (room temperature) or also at higher temperatures.

Moulding compositions in the present invention may be used to prepare moulded items of any type. Moulded items can be produced in particular by injection moulding. Examples of moulded items which can be produced are: housing parts of any kind, e.g. for domestic equipment such as juice extractors, coffee machines, mixers, for office machines such as computers, printers, monitors or copiers or cladding sheets for the building sector and parts for the automobile sector. They may also be used in the electrical engineering sector because they have very good electrical properties.

The moulding compositions are particularly suitable for producing thin-walled moulded items (e.g. parts for housings for data processing units), where particularly high specifications relating to flow behaviour and stress crack resistance are required of the plastics used.

Another form of processing is the production of moulded items by thermoforming from previously prepared sheets or films.

The present invention also provides, therefore, use of the moulding compositions according to the invention for preparing moulded items of any type, preferably those mentioned above, and moulded items made from the moulding compositions according to the invention.

EXAMPLES

Component A

A

Linear polycarbonate based on bisphenol-A with a relative solution viscosity of 1.252, measured in $CH_2Cl_2$ as solvent at 25° C. and at a concentration of 0.5 g/100 ml.

A.1

Linear polycarbonate based on bisphenol-A with a relative solution viscosity of 1.284, measured in $CH_2Cl_2$ as solvent at 25° C. and at a concentration of 0.5 g/100 ml.

A.2

Linear polycarbonate based on bisphenol-A with a relative solution viscosity of 1.200, measured in $CH_2Cl_2$ as solvent at 25° C. and at a concentration of 0.5 g/100 ml.

Component B

Styrene/acrylonitrile copolymer with a styrene/acrylonitrile ratio of 72:28 and an intrinsic viscosity of 0.55 dl/g (measured in dimethylformamide at 20° C.).

Component C

Graft polymer of 45 parts by weight of a copolymer of styrene and acrylonitrile in the ratio 72:28 on 55 parts by weight of particulate cross-linked polybutadiene rubber (average particle diameter $d_{50}=0.4$ μm), prepared by emulsion polymerisation.

Component D

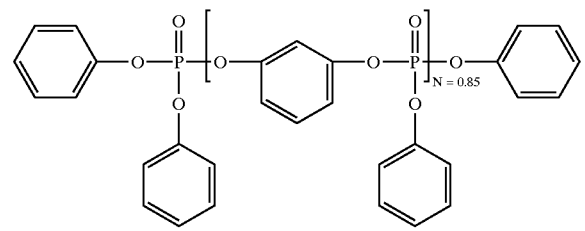

Component E

Tetrafluoroethylene polymer as a coagulated mixture formed from an SAN graft polymer emulsion in accordance with component C in water and a tetrafluoroethylene polymer emulsion in water. The ratio by weight of graft polymer C to tetrafluoroethylene polymer E in the mixture is 90 wt. % to 10 wt. %. The tetrafluoroethylene polymer emulsion has a solids contents of 60 wt. %, the average particle diameter is between 0.05 and 0.5 μm. The SAN graft polymer emulsion has a solids content of 34 wt. % and an average latex particle diameter of 0.4 μm.

Preparation of E

The emulsion of the tetrafluoroethylene polymer (Teflon 30N from Du Pont) is mixed with the emulsion of the SAN graft polymer C and stabilised with 1.8 wt. %, with respect to the polymer solids, of phenolic anti-oxidants. The mixture is coagulated at 85 to 95° C. using an aqueous solution of $MgSO_4$ (Epsom salts) and acetic acid at pH 4 to 5, filtered and washed until virtually free of electrolytes. Then the major proportion of water is removed by centrifuging and the product is dried to a powder at 100° C.

This powder can then be compounded with the other components in the equipment described.

Component F

Pural 200, an aluminium oxide hydroxide (Condea Co. Hamburg, Germany) is used as the very finely divided inorganic compound. The average particle size of the product is about 50 nm.

PREPARATION AND TESTING OF THE MOULDING COMPOSITIONS ACCORDING TO THE INVENTION

Components A to F are mixed on a 3 litre internal compounder. The moulded items are prepared in an injection moulding machine, type Arburg 270E, at 260° C.

The notched impact resistance is determined in accordance with ISO 180 1A method using rods with the dimensions 80×10×4 mm³ at room temperature.

The Vicat B softening point is determined in accordance with DIN 53 460.

The stress crack characteristics are tested using rods with the dimensions 80×10×4 mm³ with a bulk temperature of 260° C. A mixture of 60 vol. % toluene and 40 vol. % isopropanol is used as the test medium. The specimens are pre-stretched using a template shaped in a circular arc and stored together for 5 minutes at room temperature in the test medium. The extent of pre-stretching $\epsilon_x$ is 0.2 to 2.4%. The stress crack characteristics are assessed by the production of cracks or fractures as a function of the degree of pre-stretching.

The composition of the materials tested and the data obtained are summarised in the following table 1.

It can be seen from the table that the moulding compositions according to the invention have a very good combination of mechanical properties, in particular an unexpected improvement in stress crack resistance and a good flame resistance as compared with moulding compositions which do not contain any very finely divided inorganic powder (component F).

TABLE 1

Composition and properties of polycarbonate/ABS moulding compositions

| | Example | | |
|---|---|---|---|
| | 1 Comparison | 2 Comparison | 3 According to the invention |
| Components (parts by weight) | | | |
| A | 79 | — | — |
| A1 | — | 49 | 49 |
| A2 | — | 30 | 30 |
| B | 5 | 5 | 5 |
| C | 5 | 5 | 5 |
| D | 5.5 | 5.5 | 5.5 |
| E | 3 | 3 | 3 |
| F | — | — | 1.0 |
| Mould release agent | 0.5 | 0.5 | 0.5 |
| $\eta_{rel}$ | 1.252 | 1.252 | 1.252 |
| Properties: | | | |
| Vicat/B$_{120}$ (° C.) | 114 | 115 | 115 |
| Notched impact resistance: | | | |
| (kJ/m²) | 44 | 46 | 46 |
| ESC screening 5 min/1.0% | | | BR 5:00 |
| ESC screening 5 min/0.8% | | BR 5:00 | KR + OR |
| ESC screening 5 min/0.6 % | BR 3:14 | KR + OR | |
| ESC screening 5 min/0.4% | KR | | |
| MVI 240° C./5 kg ml/10 min | 16.0 | 16.4 | 16.6 |
| Fire UL 94 V (1.6 mm) | V-2 | nb* | V-0 |

*nb = not resistant

Abbreviations in Table 1 relating to stress crack characteristics are defined as follows.

ESC screening=Environmental Stress Cracking screening.

BR=Break 1

BR 5:00=The test specimen broke at five (5) minutes in the test medium.

BR 3:14=The test specimen broke at three (3) minutes, fourteen (14) seconds in the test medium. C KR=Edge Cracks.

OR=Surface Cracks.

What is claimed is:

1. A flame-resistant, thermoplastic molding composition containing:

A 5 to 95 parts by weight of a mixture of two aromatic polycarbonates A.1 and A.2 with different solution viscosities, wherein
 1. the relative solution viscosity of A.1 is 1.18 to 1.24,
 2. the relative solution viscosity of A.2 is 1.24 to 1.34, and
 3. the difference between the relative solution viscosities of A.1 and A.2 is equal to or greater than 0.06, wherein one or more further polycarbonates may be added to the mixture of A.1 and A.2, the relative solution viscosities of A.1 and A.2 being measured in $CH_2Cl_2$ at 25° C. and at a concentration of 0.5 g/100 ml;

B 0 to 50 parts by weight of a (co)polymer consisting of 1 or at least 2 ethylenically unsaturated monomers selected from styrene, α-methylstyrene, ring-substituted styrenes, acrylonitrile, methacrylonitrile, methyl methacrylate, maleic anhydride, N-substituted maleic imide and (meth)acrylates with 1 to 18 carbon atoms in the alcohol component;

C 0.5 to 60 parts by weight of graft polymer, obtainable by graft polymersation of at least two monomers selected from the group consisting of chloroprene, 1,3-butadiene, isoprene, styrene, acrylonitrile, ethylene, propylene, vinyl acetate and (meth)acrylates with 1 to 18 carbon atoms in the alcohol component;

D 0.5 to 20 parts by weight of a phosphorous compound of the formula (I)

$$R^1-(O)_{\overline{n}}-\overset{\overset{O}{\|}}{\underset{\underset{R^2}{|}}{\underset{(O)_n}{|}}{P}}-\left[O-X-O-\overset{\overset{O}{\|}}{\underset{\underset{R^3}{|}}{\underset{(O)_n}{|}}{P}}\right]_N-(O)_{\overline{n}}-R^4 \quad (I)$$

in which $R^1$, $R^2$ $R^3$ and $R^4$, independency of each other, represent an optionally halogenated $C_1$–$C_8$ alkyl group, or a $C_5$–$C_6$ cycloalkyl, $C_6$–$C_{20}$ aryl or $C_7$–$C_{12}$ aralkyl group, each optionally substituted by at least one of halogen and $C_1$–$C_4$ alkyl groups, n each, independently, represents 0 or 1, N is 0 to 30, and X represents a mono or polynuclear aromatic group with 6 to 30 carbon atoms;

E 0.05 to 5 parts by weight of a fluorinated polyolefin; and

F 0.01 to 50 parts by weight per 100 parts by weight of A to E of a very finely divided inorganic compound with an average particle diameter of less than or equal to 200 nm, said inorganic compound being selected from $Al_2O_3$, AlO(OH), zinc borate and mixtures thereof, wherein the sum of the parts by weight of A to F is 100 parts by weight.

2. The molding composition of claim 1 wherein N in formula (I) has a value from 0.3 to 20.

3. The molding composition of claim 1 wherein said copolymer B is a random copolymer of styrene and acrylonitrile.

4. The molding composition of claim 1, wherein, in formula (I), $R^1$, $R^2$, $R^3$ and $R^4$ each, independently of each other, represent $C^1$–$C_4$ alkyl groups or phenyl, naphthyl or phenyl-$C^1$–$C_4$ alkyl groups, each optionally substituted with halogen and/or alkyl groups, and X is derived from diphenols selected from bisphenol-A, resorcinol or hydroquinone, which are optionally chlorinated or brominated.

5. The molding composition of claim 1, wherein the phosphorus compound in formula (I) is at least one member selected from the group consisting of tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted aryl phosphates, dimethyl methylphosphonate, diphenyl methylphosphonate, diethyl phenyl phosphonate, triphenylphosphine oxide, tricresylphosphine oxide and m-phenylene-bis(diphenyl) phosphate.

6. The molding composition of claim 1 wherein for formula (I), $R^1$, $R^2$, $R^3$ and $R^4$ are each phenyl, n is 1, and X is a divalent residue of bisphenol A.

7. The molding composition of claim 1 wherein N of formula (I) is from 0.5 to 10.

8. The molding composition of claim 1 wherein N of formula (I) is from 0.5 to 6.

9. The molding composition of claim 1, in which the average particle diameter of said inorganic compound F is less than or equal to 150 nm.

10. The molding composition of claim 1 wherein said molding composition further comprises 0.01 to 20 wt. %, with respect to the total molding composition, of at least one further flame-resistant agent which is other than said phosphorous compound of formula (I).

11. The molding composition of claim 1, containing 10 to 90 parts by weight of component A), optionally 2 to 30 parts by weight of component B), 1 to 40 parts by weight of component C) and 1 to 18 parts by weight of component D), 0.1 to 1 part by weight of E) and 0.1 to 10 parts by weight of F).

12. The molding composition of claim 1 wherein said graft polymer C comprises a graft substrate C.2, said graft substrate C.2 being selected from a diene rubber, acrylate rubber, silicone rubber and ethylene/propylene/diene rubber.

13. The molding composition of claim 1 containing at least one additive selected from the group consisting of stabilisers, pigments, mold release agents, flow promoters and anti-static agents.

14. The molding composition of claim 1, wherein the fluorinated polyolefin E is at least one member selected from the group consisting of polytetrafluoroethylene, polyvinylidene fluoride, tetrafluoroethylene/hexafluoropropylene copolymer, and ethylene/tetrafluoroethylene copolymer.

15. Molded items produced from the molding composition of claim 1.

* * * * *